United States Patent
Verkoeyen

(10) Patent No.: US 9,852,053 B2
(45) Date of Patent: Dec. 26, 2017

(54) DYNAMIC SOFTWARE INSPECTION TOOL

(71) Applicant: GOOGLE INC., Mountain View, CA (US)

(72) Inventor: Jeffrey David Verkoeyen, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/963,222

(22) Filed: Dec. 8, 2015

(65) Prior Publication Data

US 2017/0161183 A1 Jun. 8, 2017

(51) Int. Cl.
| G06F 9/44 | (2006.01) |
| G06F 11/36 | (2006.01) |
| G06F 3/0484 | (2013.01) |
| G06T 11/20 | (2006.01) |

(52) U.S. Cl.
CPC ...... *G06F 11/3696* (2013.01); *G06F 3/04842* (2013.01); *G06T 11/206* (2013.01); *G06T 2200/24* (2013.01)

(58) Field of Classification Search
CPC G06F 3/04842; G06T 11/206; G06T 2200/24
See application file for complete search history.

(56) References Cited

U.S. PATENT DOCUMENTS

| 5,515,492 A * | 5/1996 | Li | G06Q 10/10 715/744 |
| 6,681,383 B1 * | 1/2004 | Pastor | G06F 8/30 717/126 |
| 2002/0046394 A1 * | 4/2002 | Do | G06F 8/20 717/108 |
| 2002/0158905 A1 * | 10/2002 | Bazzoni | G06F 17/30861 715/760 |
| 2004/0030741 A1 * | 2/2004 | Wolton | G06F 17/30873 709/202 |
| 2007/0005795 A1 * | 1/2007 | Gonzalez | G06F 17/30017 709/232 |
| 2007/0277108 A1 * | 11/2007 | Orgill | G06F 17/248 715/730 |
| 2008/0313618 A1 * | 12/2008 | Broman | G06F 9/445 717/130 |
| 2009/0265225 A1 * | 10/2009 | Puente | G09B 9/00 434/219 |

(Continued)

OTHER PUBLICATIONS

Brian Birtles, et. al. "Web Animations". Typescript, Jul. 7, 2015. http://www.w3.org/TR/web-animations/ Last Accessed: Nov. 20, 2015.

(Continued)

*Primary Examiner* — Chameli Das
(74) *Attorney, Agent, or Firm* — Troutman Sanders LLP; James E. Schutz; Brennan M. Carmody

(57) ABSTRACT

A dynamic software inspection tool is disclosed. The tool executes a method which may include obtaining a status for at least one graphical object from the selected software and outputting the information contained within the status for the at least one graphical object for display on a graphical user interface (GUI). The status for the at least one graphical object may include instruction assigned to the graphical object, software "actors" assigned to the graphical object, properties assigned to the at least one graphical object.

19 Claims, 7 Drawing Sheets

(56) References Cited

U.S. PATENT DOCUMENTS

| | | | | |
|---|---|---|---|---|
| 2011/0107220 | A1* | 5/2011 | Perlman | A63F 13/12 715/720 |
| 2014/0310694 | A1* | 10/2014 | Granshaw | G06F 11/3624 717/131 |
| 2015/0286376 | A1* | 10/2015 | Tijssen | G06F 3/04845 345/474 |
| 2015/0379011 | A1* | 12/2015 | Neyyan | G06F 17/30044 345/581 |

OTHER PUBLICATIONS

"QS-Animation-Houdini 3D Animation Tools". Web Tutorial. Side Effects Software. https://web.archive.org/web/20160301125542/https://www.sidefx.com/index.php/?option=com_content&task=blogcategory&id=250&Itemid=405 Last Accessed: Nov. 20, 2015.

* cited by examiner

DYNAMIC SOFTWARE INSPECTION TOOL

BACKGROUND

Three primary tools for exist inspecting animations and interactions (collectively "motion") while developing applications: the step debugger, the "sandbox," and the statistical instrumentation tool. Nearly every platform provides a step debugger, which is a means of pausing the execution of a system and inspecting its state. This format of inspection and debugging inherently conflicts with inspecting things that change over time, such as animations, gestural input, and simulations. Additionally, some prototyping tools allow designers to deploy prototype applications on devices in a "sandbox" environment controlled by the tool. Various platforms also provide instrumentation tools that are able to gather statistical information about the running application while minimally impacting its execution. However, a tool that combines the benefit of all three tools would be very beneficial.

SUMMARY

A system is disclosed including a processor and non-transient memory, which is operatively connected to the processor. The non-transient memory may include instructions which, when executed by the processor, cause the processor to execute a method which may include searching for a selected software process running on a computing device, obtaining a status for at least one graphical object from the selected software, and outputting the information contained within the status for at least one graphical object for display on a graphical user interface (GUI). The status for the at least one graphical object may include at least one instruction assigned to the at least one graphical object, at least one actor assigned to the at least one graphical object, and at least one property assigned to the at least one graphical object.

In another example implementation, a system is disclosed including a processor and non-transient memory operatively connected to the processor. The non-transient memory may include instructions which, when executed by the processor, cause the processor to execute a method which may include receiving a request for graphical object status information from an external software process, intercepting the requested graphical object status information via a plurality of inspection hooks inserted in a selected software process; and transmitting the graphical object status information to the external software process.

DETAILED DESCRIPTION

Some implementations of the system presented in this disclosure may allow a software developer to inspect and modify the internal structure of a software process in real time, while the process is running in a commercial product environment, without disturbing its function. Some implementations may not require stopping or stepping-through the process (a debugger). Additionally, some implementation may not require a testing environment that isolates untested code changes from the production environment (a sandbox). The system may provide an inspection tool which communicates with hooks inserted into a process to be inspected. In one example implementation, the process to be inspected may be a motion engine which includes graphical objects and actors which control the motion (animations and interactions) of the graphical objects. The graphical objects may include hooks which transmit motion-related properties of the graphical objects. The actors may include hooks which transmit instructions to modify motion-related properties of the graphical objects. The actors may also include hooks which allow the developer to modify instructions through the inspection tool, causing the properties of the graphical objects to change in real time, while the process is running. In one example implementation, the hooks are automatically inserted into the graphical objects and/or actors by a development tool which the developer uses to create the motion-related code.

As used herein, an object can be a variable, a data structure, or a function. An object may have one or more state properties, one or more behavior properties, or both. For example, a "graphical object" may refer to a visual element of a GUI and the underlining data, process, and/or subroutine that it represents. Similarly, "property" may refer to variables that define the appearance and behavior of a graphical object, especially with regard to motion as described above. An "instruction" may refer to a direction or intention to alter one or more properties of an object, for example a specific graphical object. An "actor" may refer to a non-graphical object (e.g. a software process or a subroutine) capable executing or implementing instructions, as defined above, by changing one or more properties of a graphical object.

Figure 1:
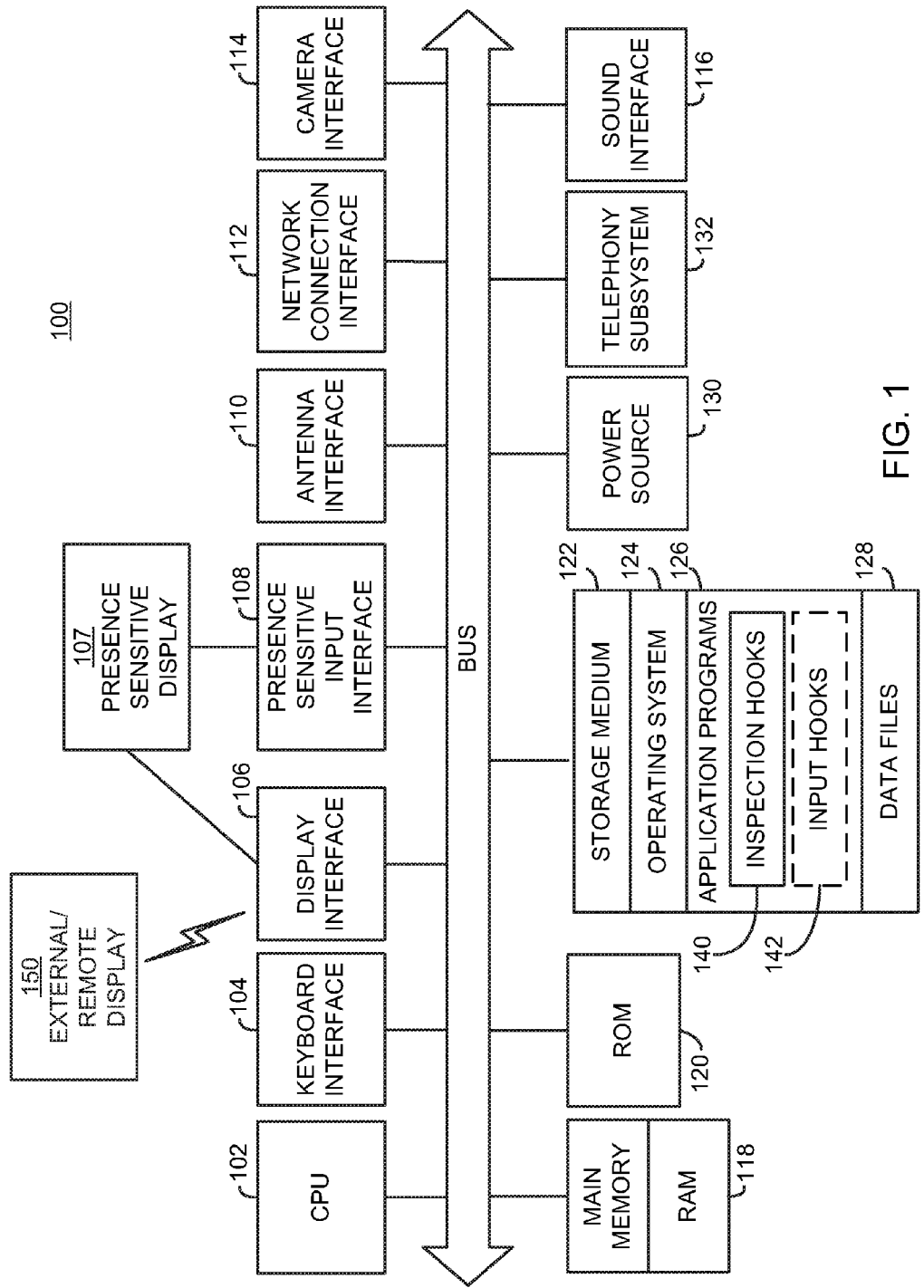
FIG. 1 is a block diagram of a computing system for use with the dyunamic software inspection tool and/or a computerized motion architecture illustrating the functional relationships between its components in accordance with the present disclosure.

Referring now to the Figures, in which like reference numerals represent like parts, various implementations of the computing devices and methods will be disclosed in detail. FIG. 1 is a block diagram illustrating one example of a computing device 100 suitable for use with the disclosed computerized motion architecture.

FIG. 1 depicts a block diagram of an illustrative computing device architecture 100, according to an example implementation. As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to some implementations of the disclosed technology, the display interface 106 may be directly connected to a local display, such as a touch-screen display associated with a mobile computing device. In another example implementation, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some implementations, the display interface 106 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example implementation, the computing device architecture 100 may include a presence-sensitive display interface 107 for connecting to a presence-sensitive display. According to certain some implementations of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. According to certain implementations, a camera interface 114 is provided that acts as a communication interface and provides functions for capturing digital images from a camera. According to certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. In one example implementation, application programs 126 may include inspection hooks 140. In another example implementation, application programs 126 may include input hooks 142. According to an example implementation, the computing device architecture 100 includes a power source 130 that provides an appropriate alternating current (AC) or direct current (DC) to power components. According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system, application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device may be coupled, connected, and/or in communication with one or more peripheral devices, such as display. In another example implementation, the term computing device, as used herein, may refer to a mobile computing device such as a smartphone or tablet computer. In this example implementation, the computing device may output content to its local display and/or speaker(s). In another example implementation, the computing device may output content to an external display device (e.g., over Wi-Fi) such as a TV or an external computing system.

In some implementations of the disclosed technology, the computing device may include any number of hardware and/or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
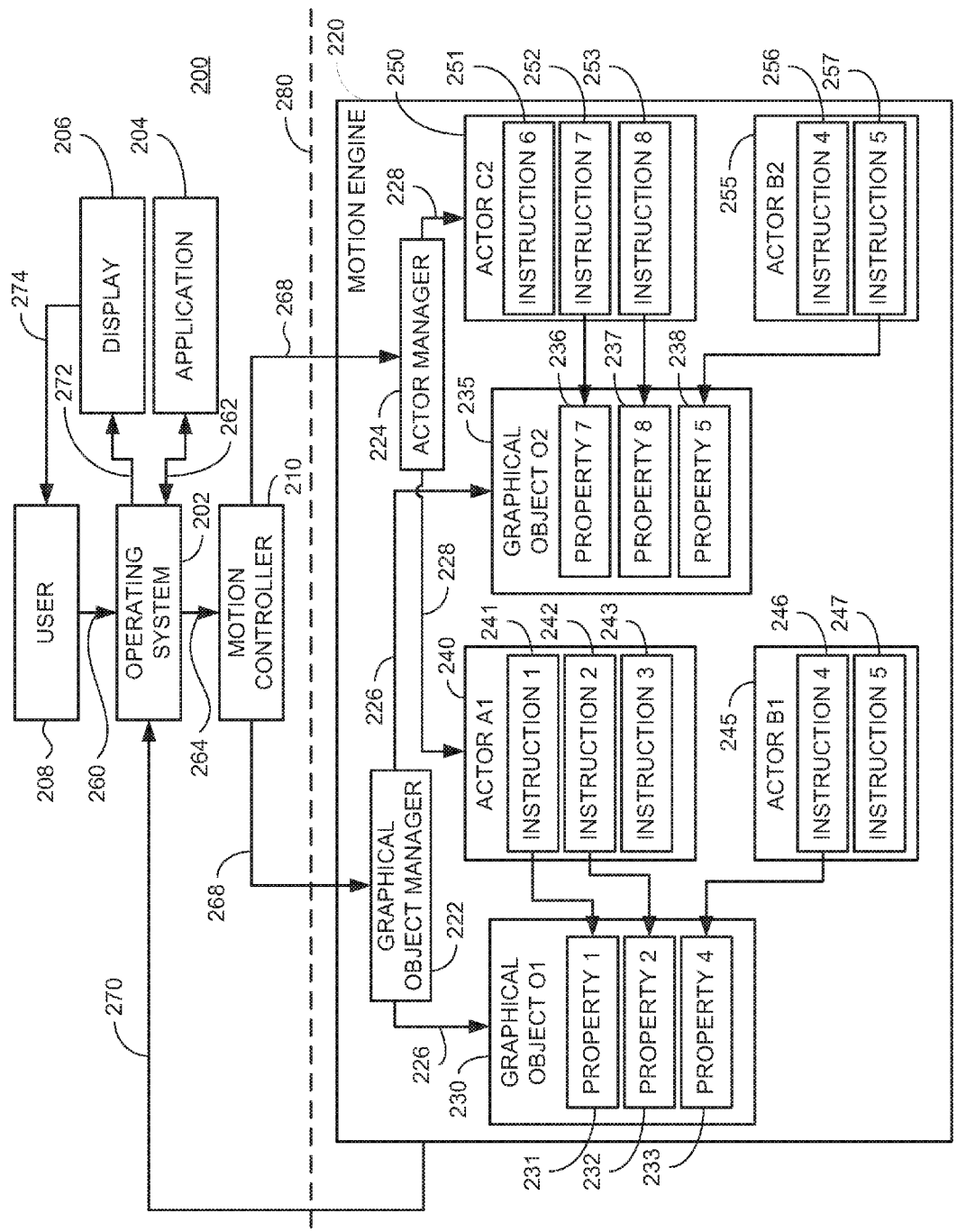
FIG. 2 is a block diagram of a computerized motion architecture illustrating the functional relationships between its components and the remainder of a computing system, in accordance with the present disclosure.

FIG. 2 is a block diagram of a computerized motion architecture illustrating the functional relationships between its components and the remainder of a computing system. The motion engine described in this computerized motion architecture is one example of a process which may be inspected by tools described in this disclosure. In an example implementation, the computerized motion architecture 200 includes a motion controller 210 and a motion engine 220 operatively connected to an operating system 202, an application 204, and a display device 206. In operation, the operating system 202 obtains input 260 from a user 208. If necessary, the operating system 202 communicates with the application 206 to determine what motion, if any, is necessary from the computerized motion architecture 200. If motion is required, the operating system 202 instantiates a motion controller 210 to control the motion and communicates the requested motion 264. The motion controller 210 generates a motion instruction message 268 based on the requested motion 264. The motion controller 210 communicates the motion instruction message 268 to a motion engine 220, which distributes the motion instruction message 268 to a graphical object manager 224 and an actor manager 224. If necessary, the motion controller 210 also instantiates a new motion engine 220 for the requested motion 264.

The motion instruction message 268 includes a list of one or more graphical objects and motion instructions for those one or more graphical objects. In response to the motion instruction message 268, the graphical object manager 222 instantiates 226 any necessary graphical objects 230, 235 which do not already exist. The graphical objects 230, 235 will be the subjects of the requested motion 264. Likewise, if a graphical object 230, 235 is no longer needed, the graphical object manager 222 dismisses it from memory (not shown).

Also in response to the motion instruction message 268, the actor manager 224 determines what types of actors are required to execute the motion instructions in the motion instruction message 268. The actor manager 224 then instantiates the necessary actors 240, 245, 250, 255 and assigns them to graphical objects 230, 235. Multiple actor types (e.g. A, B, and C) are available, each actor type specialized to execute families of motion instructions. For example, and not in limitation, actor types may be specialized for time-based animation (translation, rotation, flexion, etc.), gestural interaction (dragging, dropping, expanding, contracting, etc.), spatial interaction (using movement of a computing device to drive an animation) and physically-simulated animation (gravity effects, rebounding effects, etc.). In one example implementation, spatial interaction may include using a gyroscope and/or inertial dead reckoning from an accelerometer to measure orientation of a computing device and drive a corresponding motion. In another example implementation, spatial interaction may include using an accelerometer to measure displacement of a computing device and drive a corresponding motion. In another example implementation, spatial interaction could be used to adjust the camera perspective in a virtual or augmented reality system. Developers may also create new types of instructions and new types of actors which can be incorporated into the architecture as required.

The actors execute the instructions by altering properties of the graphical objects. For example, in the implementation illustrated in FIG. 2, actor A1 (actor type "A", assigned to graphical object O1) 240 may be specialized for time-based animation and capable of executing three time-based animation instructions 241, 242, 243. For example, the motion instruction message 268 may direct graphical object O1 230 to move linearly 241 across the screen and rotate 242 at the same time. Actor A1 240 is capable of executing these instructions by altering corresponding properties 231, 232 of graphical object O1 230. However, actor A1 may be capable of executing additional instructions 243 which are not currently needed for graphical object O1. Graphical object O1 230 may also have a gestural instruction assigned to it, such as being expandable in the GUI. Actor B1 245 is capable of executing this instruction 246 by altering a corresponding property 233 of graphical object O1 230. However, actor B1 may be capable of executing additional instructions 247 which are not currently needed for graphical object O1.

As a further example, the motion instruction message 268 may direct graphical object O2 235 to be draggable 257 in the GUI and to respond to "gravity" 252 (e.g., to be drawn toward the bottom of the screen) and to have a coefficient of restitution 253 (e.g. to "bounce" when it reaches the edge of the display). Actor B2 255 is capable of executing the gestural instruction 257 by altering a corresponding property 238 of graphical object O2 235. However, actor B2 255 may also be capable of executing additional instructions 256 which are not currently needed for graphical object O2 235. Actor C1 250 is capable of executing the physical simulation instructions 252, 253 by altering the corresponding properties 236, 237 of graphical object O1 230. However, actor B1 may also be capable of executing additional instructions 251 which are not currently needed for graphical object O2.

After the actors execute their instructions, the motion engine 220 sends a message 270 with all of the graphical objects and their properties back to the operating system 202. The operating system 202 then renders a screen image 272 based on the graphical objects and their properties and sends the image 272 to the display 206 to be output 274 to the user.

The motion engine 220 may be operating-system agnostic, environment agnostic, and platform agnostics. Therefore, in some implementations, the motion controller 210 and the motion engine 220 may exist in separate processes, platforms, or even in separate devices. This property of the motion engine 220 makes the architecture more portable between operating systems, programming languages, environments, and devices. In one example implementation, the same motion engine 220 may be deployed in the same application for multiple operating systems (e.g. iOS, Android, Windows, Linux). Each operating system would generate specific motion controllers 210, but these motion controllers 210 would generate identical motion instruction messages 268 which would be communicated to identical motion engines 220. This feature of the computerized motion architecture greatly enhances the portability of a particular motion engine between platforms, simplifying application development.

In another example implementation, the motion controller 210 may be implemented in one platform (e.g. HTML or Javascript) while the motion engine 220 may be implemented in another platform (e.g. iOS, Windows, Linux, etc.) This feature again improves the portability of the architecture and also imparts additional functionality. For example, if the motion engine 220 may be implemented in HTML or Javascript, that simplifies controlling motion via a web portal, e.g., for a web-based game or application.

In another example implementation, the motion controller 210 may be implemented on a different device than the motion engine 220. For example, this implementation would allow a relatively underpowered device like a mobile phone or tablet to use a more powerful computer to generate its motion effects. In another example, a wearable device (e.g. smart watch) can use the greater processing power of a mobile phone or tablet to generate its motion effects. This feature allows the weaker device to implement motion graphics it might not otherwise be capable of and promotes scalability of motion effects.

Figure 3:
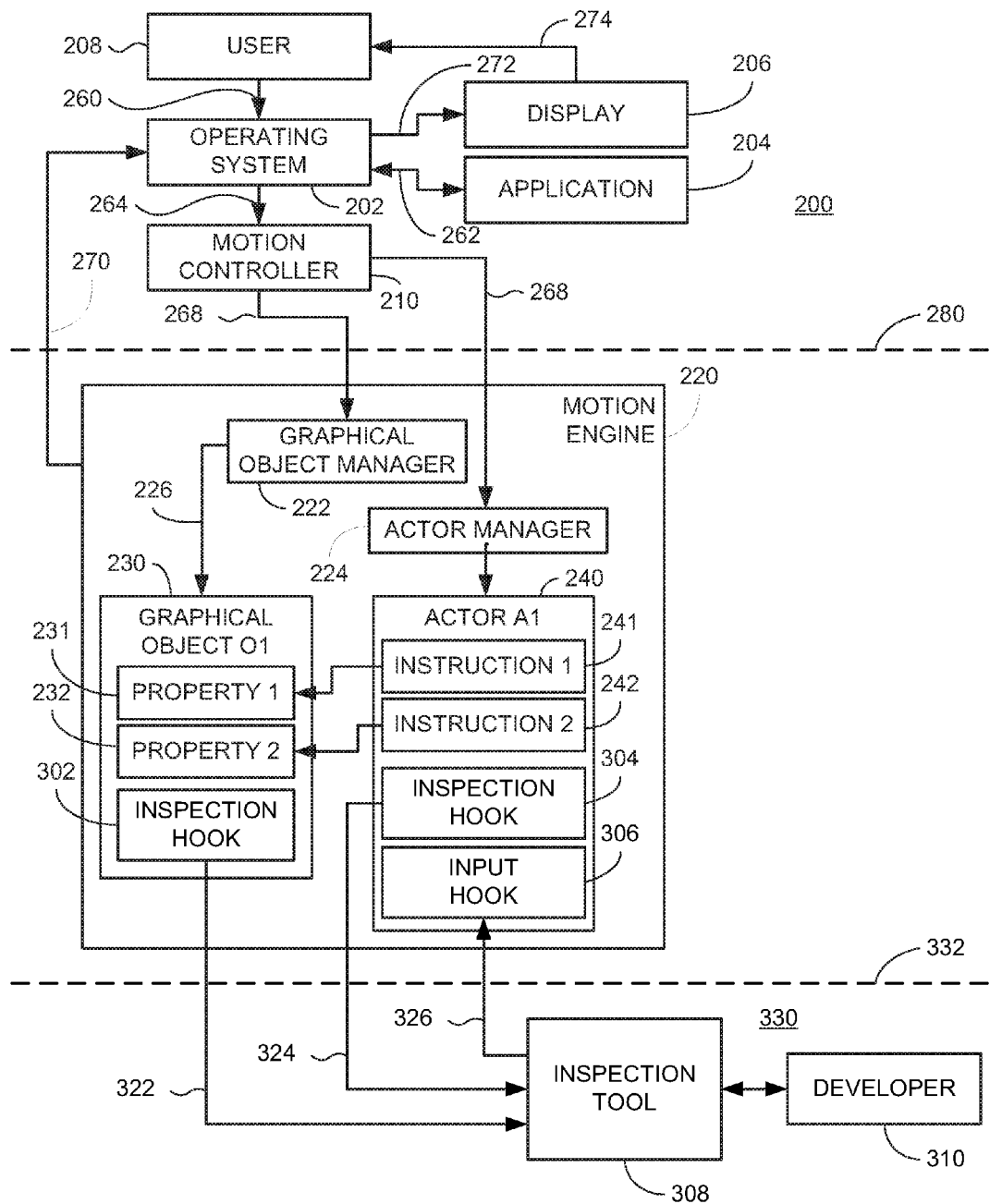
FIG. 3 is a block diagram of a simplified computerized motion architecture illustrating hooks inserted into a graphical object and an actor for the purpose of interacting with a dynamic software inspection tool, in accordance with the present disclosure.

FIG. 3 is a block diagram of a simplified computerized motion architecture illustrating hooks inserted into a graphical object and an actor for the purpose of interacting with an inspection tool. In addition to the components of the motion architecture 200, this example implementation includes an inspection tool 308 being used by a developer 310. The developer 310 uses the inspection tool 308 in a separate environment 330 from the environment of the motion engine. In one example implementation, the inspection tool environment may be a separate device.

In this example implementation the graphical object 230 includes an inspection hook 302. The inspection hook 302 broadcasts status information 322 about the properties 231, 232 of the graphical object 230 to one or more inspection tools 308 that may be listening for it. In this implementation the actor 240 also includes an inspection hook 304 and an input hook 306. The inspection hook 304 broadcasts information 324 about the instructions 241, 242 assigned to the graphical object 230 to any inspection tool 308 which might be listening for it. The input hook 306 may receive requests 326 to alter instructions 241, 242. When the input hook 306 alters instructions 241, 242, the instructions 241, 242 will modify the corresponding properties 231, 232 of the graphical object 230.

Figure 4:
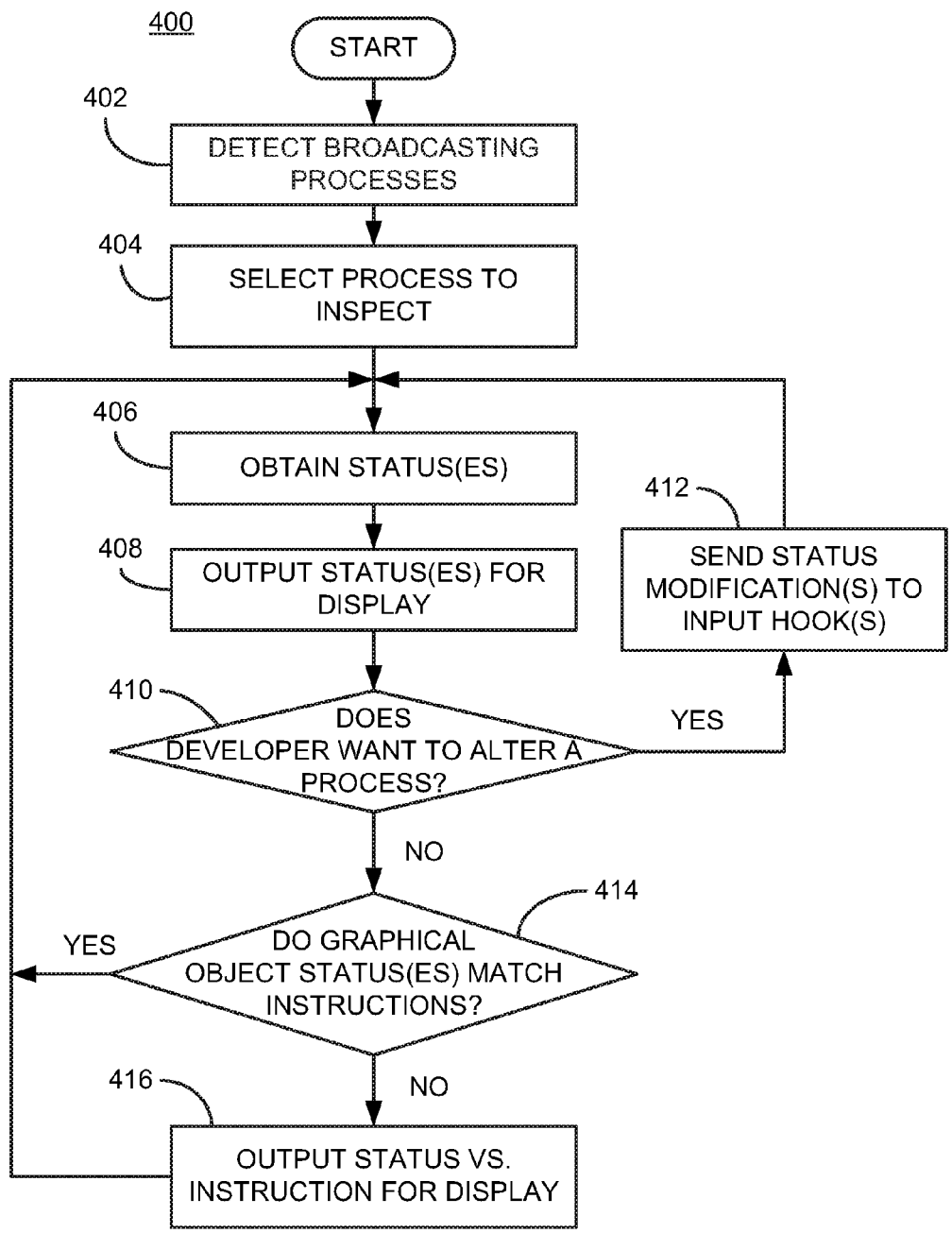
FIG. 4 is a flowchart illustrating an example implementation of a method of inspecting a software process from the perspective of the dynamic software inspection tool, in accordance with the present disclosure.

FIG. 4 is a flowchart illustrating an example implementation of a method 400 of inspecting a software process from the perspective of an inspection tool. At 402, an inspection tool detects a software processes broadcasting one or more statuses. In some example implementations, multiple processes may be broadcasting statuses. In some example implementations, the software process broadcasting the one or more statuses may be a motion engine. In some example implementations the statuses broadcast by the motion engine may include graphic object properties and/or actor instructions. At 404, the developer using the inspection tool selects a process to inspect. At 406 the inspection tool obtains one or more statuses from the process being inspected. At 408 the inspection tool outputs one or more statuses for display in a GUI. At 410 the inspection tool waits for a command from the developer to alter a status within the process. At 412, if a command to alter the process is given, the inspection tool sends modified instructions to input hooks within the process, then returns to 406 to obtain updated statuses. At 414, if no command to alter the process is given, the inspection tool may compare the current statuses within the process to their corresponding instructions. If no discrepancies are noted between the statuses and their corresponding instructions, the inspection tool then returns to 406 to obtain updated status. At 416, if discrepancies are noted between the statuses and their corresponding instructions, the discrepancies are outputted for display in a GUI. The inspection tool then returns to 406 to obtain updated status.

Figure 5:
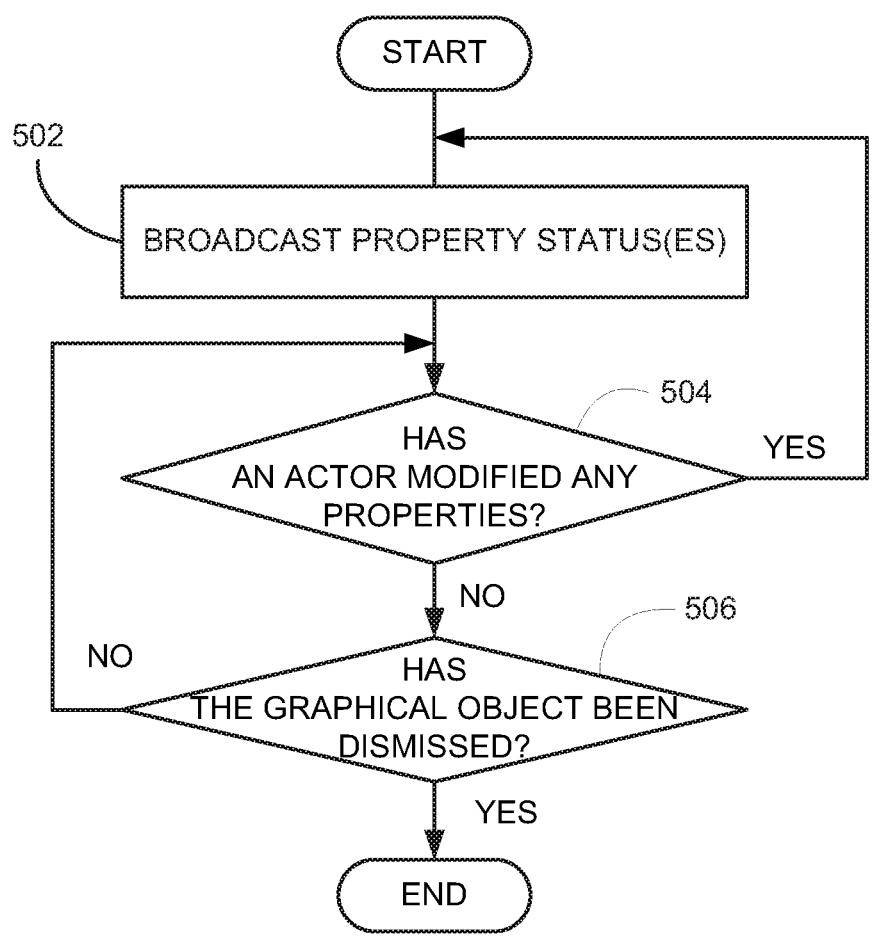
FIG. 5 is a flowchart illustrating an example implementation of a method of inspecting a software process from the perspective of a graphical object being inspected, in accordance with the present disclosure.

FIG. 5 is a flowchart illustrating an example implementation of a method of inspecting a software process from the perspective of a graphical object within a motion engine. At 502, the inspection hook within the graphical object broadcasts its present status. At 504 the graphical object determines if an actor has modified any of the graphical object's properties. If a property has been modified, the inspection hook broadcasts 502 the property statuses. At 506, if no property changes have been made, and the graphical object has not been dismissed by the motion engine, it returns to 502 and broadcasts its properties again.

Figure 6:
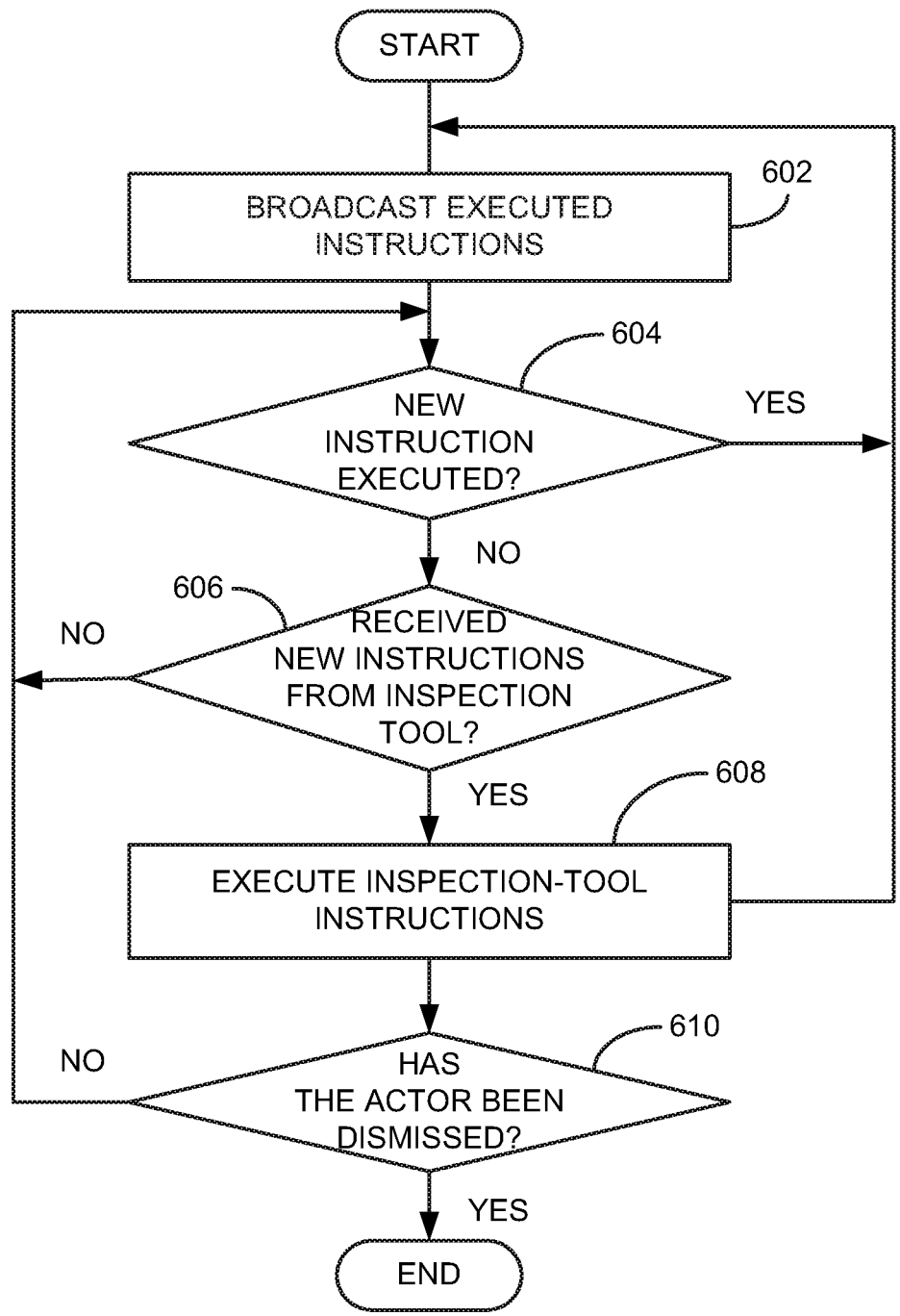
FIG. 6 is a flowchart illustrating an example implementation of a method of inspecting a software process from the perspective of an actor being inspected, in accordance with the present disclosure.

FIG. 6 is a flowchart illustrating an example implementation of a method of inspecting a software process from the perspective of an actor within a motion engine. At 602 the inspection hooks in the actor broadcast any instructions which have been executed. In one example implementation, this may be an alternative means of tracking the status of a graphical object, as opposed to directly broadcasting the property status from the graphical object. At 604, if the actor has executed a new instruction since the last broadcast, it will broadcast the newly executed instruction. At 606, if the actor has not executed a new instruction since the last broadcast, it may check its input hooks for new commands from the inspection tool to alter the status of the graphical object. If new commands have not been received from the inspection tool, the actor returns to 604. At 608, if new commands have been received from the inspection tool, the actor executes them by modifying properties of its assigned graphical object. At 610, if the actor has not been dismissed by the motion engine, the actor returns to 604.

Figure 7:
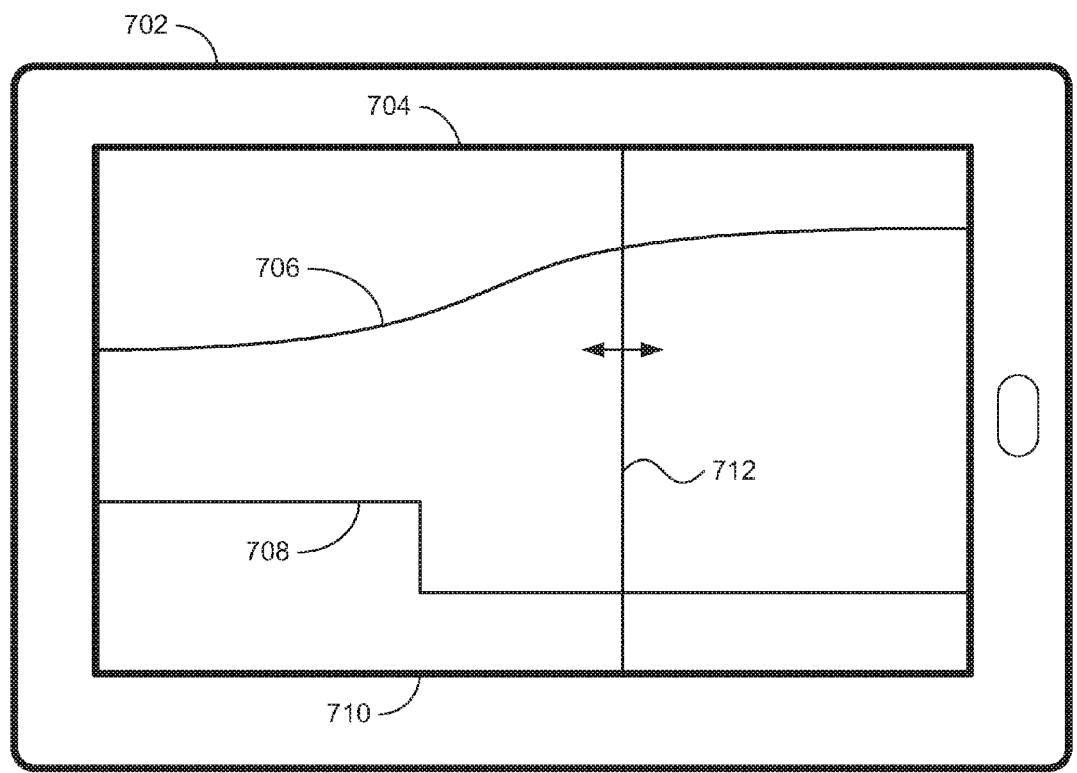
FIG. 7 is a schematic of an example implementation of a user interface for an inspection tool, illustrating different types of graphical features within the interface, in accordance with the present disclosure.

FIG. 7 is a schematic of an example implementation of a user interface for an inspection tool, illustrating different types of graphical features within the interface. In one example implementation, the GUI includes a device 702 which includes a display 704. While a process is being inspected, the GUI displays the various statuses 706, 708 as a function of time, where time is the horizontal axis 710. In one example implementation, a status 706 may vary continuously over time. For example, a status 706 may represent a horizontal position of an icon as it moves across a screen, or an angular displacement of an icon as it rotates on screen. In another example implementation, a status 708 may experience instantaneous changes. For example, an icon being inspected may be "grayed-out" and suddenly lose the property of being selectable by a user within the motion engine. In some implementations, the GUI may also include a line 712 which the developer can drag back and forth to change the position in time at which the statuses are being inspected. In some implementation, dragging the line forward or backward may also cause the motion in the application being inspected to proceed forward or backward in time.

To facilitate an understanding of the principals and features of the disclosed technology, example implementations are explained above. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise. Similarly, plural forms include singular referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

The design and functionality described in this application is intended to be an example and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, a graphical object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of this technology are described above with reference to block and flow diagrams of computing devices and methods and/or computer program products according to example implementations of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, some implementations of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of this disclosure have been described in connection with what is presently considered to be the most practical and various implementations, it is to be understood that this disclosure is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the technology and also to enable any person skilled in the art to practice certain implementations of this technology, including making and using any apparatuses or systems and performing any incorporated methods. The patentable scope of certain implementations of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a processor; and
non-transient memory, operatively connected to the processor, the non-transient memory comprising instructions which, when executed by the processor, cause the processor to execute a method comprising:
obtaining a status for at least one graphical object from at least one first inspection hook inserted within the at least one graphical object, the at least one graphical object being associated with a selected software process running on a computing device, where the status for the at least one graphical object comprises information indicating one or more properties assigned to the at least one graphical object;
outputting information contained within the status for the at least one graphical object for display on a graphical user interface (GUI);
receiving an indication of a user input to change the at least one graphical object;
effectuating modification of the at least one graphical object in accordance with the user input by transmitting a command to at least one input hook inserted within one or more actors assigned to the at least one graphical object, the one or more actors being configured to control one or more properties of the graphical object by executing one or more instructions, and where the command modifies the one or more instructions;
obtaining a status for the one or more instructions from at least one second inspection hook inserted within the one or more actors assigned to the at least one graphical object;
detecting a discrepancy between the status for the one or more instructions and the one or more properties assigned to the at least one graphical object; and
outputting information indicating the detected discrepancy for display on the GUI.

2. The system of claim 1, where obtaining the status for the at least one graphical object from the selected software process does not interfere with the operation of the selected software process.

3. The system of claim 1, where the first inspection hooks are configured to broadcast the status for the at least one graphical object to at least one software process configured to obtain the status for the at least one graphical object.

4. The system of claim 3, where the first inspection hooks are configured to broadcast the status for the at least one graphical object every time a motion engine is initiated by the selected software process.

5. The system of claim 4, where every motion engine of a plurality of motion engines is displayed as a separate item in the GUI.

6. The system of claim 5, where selecting a motion from the plurality of motion engines with the GUI causes the GUI to display graphical representations of the status of each graphical object associated with the motion engine.

7. The system of claim 6, where the GUI also displays at least one graphical control mechanism for each graphical object associated with the motion engine.

8. The system of claim 7 where the at least one graphical control mechanism is a timeline displaying a graphical indication of the status of each graphical object within the motion engine versus time and which accepts user input to change a relative time at which the status of each graphical object is inspected.

9. The system of claim 1, where the computing device running the selected software process is physically separate from the system.

10. The system of claim 9, where the status for the at least one graphical object is obtained from the computing device via a hardwired connection.

11. The system of claim 9, where the status for the at least one graphical object is obtained from the computing device via a wireless connection.

12. The system of claim 11 where the wireless connection is at least one of a Bluetooth connection and a WiFi connection.

13. The system of claim 1, where the computing device running the selected software process is a component of the system.

14. The system of claim 1, wherein
the GUI comprises a timeline displaying a graphical indication of the one or more properties of the at least one graphical object over time, and
the GUI is configured to receive a user input to change a point in time on the timeline at which the one or more properties of the at least one graphical object is inspected.

15. The system of claim 14, wherein the GUI further comprises a line disposed on the timeline reflecting the point in time on the timeline at which the status of the at least one graphical object is inspected, the line being adjustable in response to the user input to change the point in time on the timeline at which the status of the at least one graphical object is inspected.

16. The system of claim 15, wherein the instructions, when executed by the processor, cause the processor to execute the method further comprising:
transmitting, in response to the user input to change a point in time on the timeline at which the one or more properties of the at least one graphical object is inspected, a command to the at least one input hook to modify the one or more properties assigned to the at least one graphical object to be consistent with the status of the at least one graphical object at the point in time on the timeline at which the status of the at least one graphical object is inspected.

17. A system comprising:
a processor;
non-transient memory, operatively connected to the processor, the non-transient memory comprising instructions which, when executed by the processor, cause the processor to execute a method comprising:
intercepting requested graphical object status information for at least one graphical object from at least one first inspection hook inserted the at least one graphical object, the at least one graphical object being associated with a selected software process running on a computing device, where the status for the at least one graphical object comprises information indicating one or more properties assigned to the at least one graphical object;
transmitting the intercepted graphical object status information to an external software process;
receiving, from the external software process, an indication of an instruction to change the at least one graphical object;
transmitting, in response to receiving the indication for the instruction, a command to at least one input hook inserted within one or more actors assigned to the at least one graphical object, the one or more actors being configured to control one or more properties of the graphical object by executing one or more instructions, and where the command modifies the one or more instructions;
intercepting status information for the one or more instructions from at least one second inspection hook inserted within the one or more actors assigned to the at least one graphical object;
transmitting the intercepted status information for the one or more instructions to the external software process,
wherein the external software process detects a discrepancy between the status for the one or more instructions and the one or more properties assigned to the at least one graphical object and outputs information indicating the detected discrepancy for display on the GUI.

18. The system of claim 17 where intercepting the requested graphical object status information via the at least one first inspection hook does not interfere with the performance of the selected software process.

19. The system of claim 17, where implementing the command to modify the one or more instructions not interfere with the performance of the selected software process.

* * * * *